(No Model.)  2 Sheets—Sheet 1.

V. BÉLANGER.
BICYCLE.

No. 526,360.  Patented Sept. 18, 1894.

WITNESSES:
A. D. Harrison
P. Davis

INVENTOR:
Victor Bélanger
by Wright Brown Crossley
Attys.

(No Model.) 2 Sheets—Sheet 2.

V. BÉLANGER.
BICYCLE.

No. 526,360. Patented Sept. 18, 1894.

WITNESSES:
A. D. Harrison.
P. Davis.

INVENTOR:
Victor Bélanger
by Wright Brown Crowley
Attys

# UNITED STATES PATENT OFFICE.

VICTOR BÉLANGER, OF BOSTON, MASSACHUSETTS, ASSIGNOR OF ONE-HALF TO JOSIAH QUINCY, OF SAME PLACE.

BICYCLE.

SPECIFICATION forming part of Letters Patent No. 526,360, dated September 18, 1894.

Application filed May 28, 1894. Serial No. 512,675. (No model.)

*To all whom it may concern:*

Be it known that I, VICTOR BÉLANGER, of Boston, in the county of Suffolk and State of Massachusetts, have invented certain new and useful Improvements in Bicycles, of which the following is a specification.

The prime object of this invention is to provide means in a bicycle whereby the rider's weight can be utilized to promote propulsion of the machine. This is accomplished by an arrangement whereby the weight is lifted forward of the center of rotation of the driven wheel when force applied to the pedals acts most effectively to turn the crank-shaft, and falls when the rotative effect of said force ceases, as in crossing dead centers, thus acting to propel the wheel at such times. It will be seen that by such an arrangement a certain amount of power is stored up for use in overcoming dead centers, and there is a more uniform application of power.

The accompanying drawings which form part of this specification illustrate an embodiment of the invention.

Figure 1:
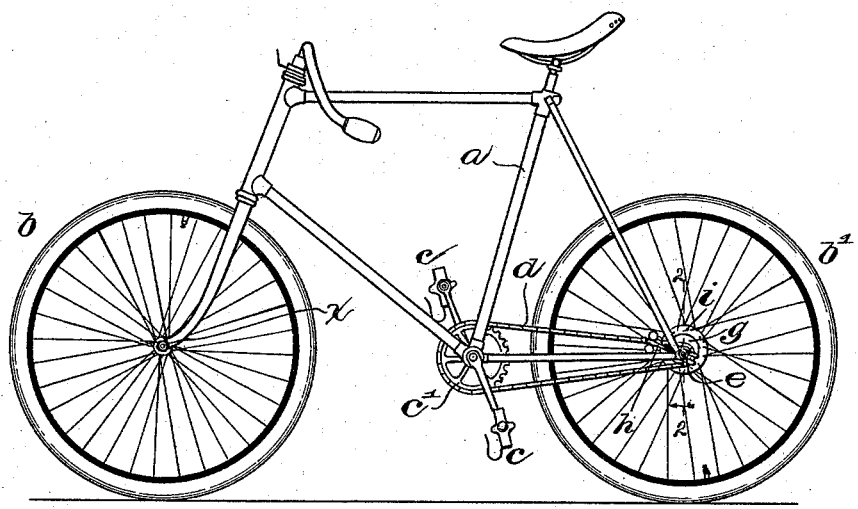
Figure 2:
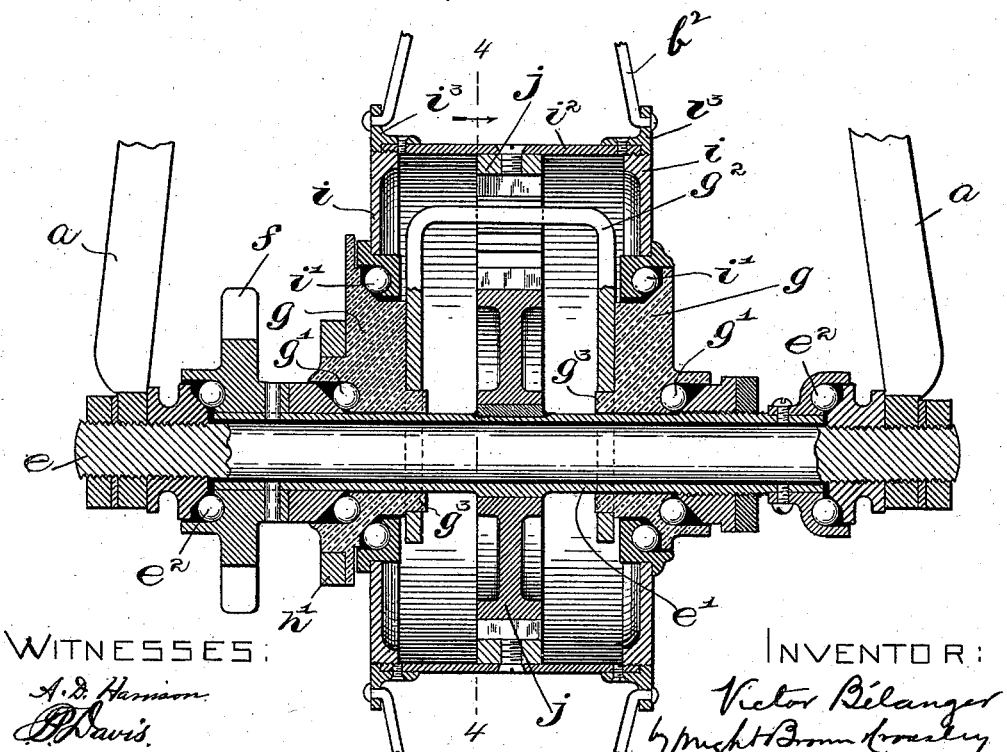
Figure 3:
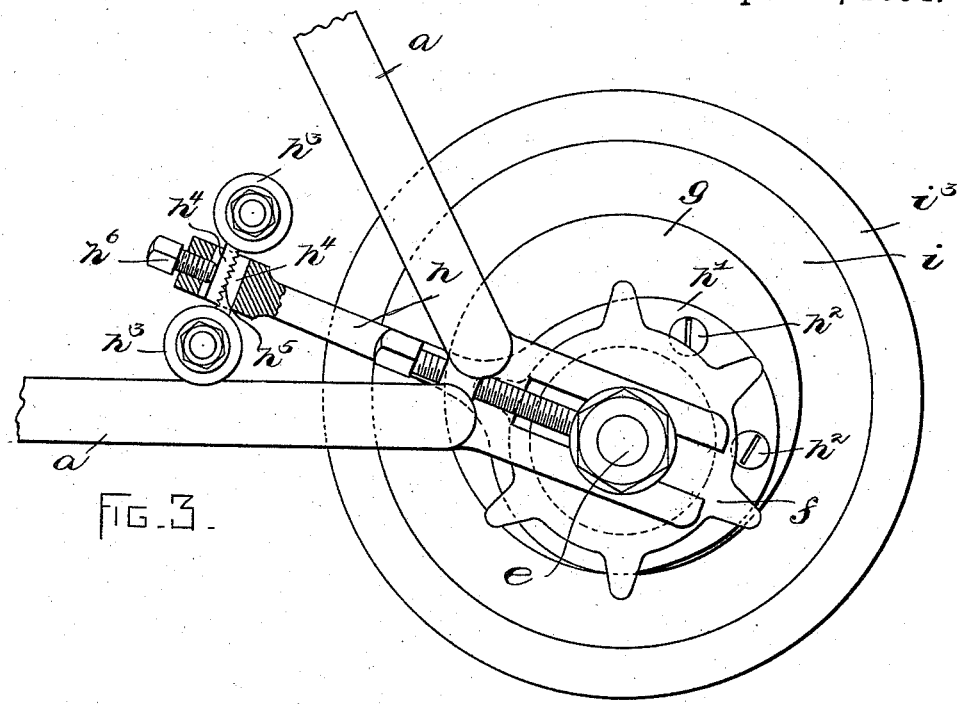
Figure 4:
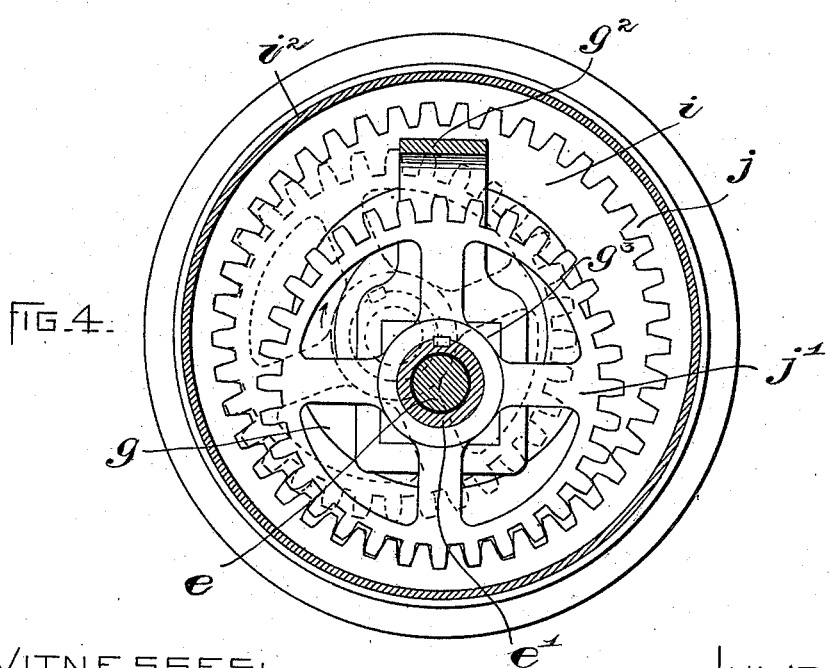

Figure 1 shows a side elevation of a bicycle of the well known safety type with my improvements applied thereto. Fig. 2 shows a section on line 2—2 of Fig. 1, with the parts on a greatly enlarged scale. Fig. 3 shows parts at the hub of the rear wheel in side elevation on an enlarged scale. Fig. 4 shows a section on line 4—4 of Fig. 2.

The letter, $a$, designates the frame of the bicycle which may be of any suitable form or construction; $b$, the front wheel; $b'$, the rear wheel; $c$, the pedals; $c'$, the driving sprocket-wheel, and $d$ the sprocket-chain.

An axle or shaft, $e$, is fastened between the rear fork of the frame and a sleeve, $e'$, surrounds said shaft and may rotate thereon, ball-bearings, $e^2$, being arranged in a well-known way between the shaft and sleeve. A sprocket-wheel, $f$, is affixed to the said sleeve and the chain, $d$, engages said wheel and transmits motion thereto and consequently to the sleeve.

The sleeve does not constitute the hub of the rear wheel as in the ordinary construction of bicycles, but said sleeve is supported in the hub of the wheel in such a manner as to permit its oscillating therein to a limited extent. The hub takes the form of a drum and is made up of side-plates, $i$, a cylindrical shell, $i^2$, screw-threaded to receive the annular side-plates, and flanges, $i^3$, fastened to said cylindrical shell and to which the spokes, $b^2$, of the wheel are secured.

Circular disks, $g$, are journaled concentrically in the sides or heads, $i$, of the hub with interposed ball-bearings, $i'$, and the two disks are rigidly secured together by a yoke, $g^2$, whose side-arms fit square bosses, $g^3$, formed on the disks. The sleeve, $e'$, is journaled in the disks, $g$, eccentrically thereto with interposed ball-bearings, $g'$, and these disks together form an oscillatory bearing for the sleeve whose oscillations are limited through the following described means.

An arm, $h$, having an annular base-portion, $h'$, which embraces a hub on one of the disks, is fastened to that disk by screws, $h^2$, and carries at its outer end a cross-head equipped with buffers, $h^3$, arranged to abut divergent portions of the frame.

The cross-head is composed of two overlapping members, $h^4$, fitting through a transverse opening in the arm and having interlocking serrations, $h^5$, in their confronting faces. A set-screw, $h^6$, is entered through the end of the arm and bears against the cross-head. By this construction provision is made for adjustment to allow more or less movement of the oscillatory bearing.

The buffers, $h^3$, are cylinders of rubber or other sound-deadening material fitted on studs fastened in the members of the cross-head.

An internal gear, $j$, is fastened to the inside of the cylindrical shell, $i^2$, and a pinion, $j'$, is affixed to the sleeve, $e'$, and meshes with said internal gear.

The gear teeth are so constructed that they do not normally sustain the weight of the rider, but this weight is supported on the ball bearings between the disks and the hub.

The sleeve constitutes the axle of the pinion, and power applied through the means heretofore described to rotate said sleeve, is transmitted to the wheel through the pinion, $j'$, and internal gear, $j$.

Normally the pinion, $j$, engages the lowest part of the internal gear, as shown in full lines in Fig. 4. When force is applied to the pedals in those portions of their strokes where the force acts to turn the crank-shaft, not only is rotary motion transmitted to the rear-wheel, but, in the presence of sufficient resistance, the pinion, $j'$, is caused to traverse the internal gear as far as the arm, $h$, will permit. By this action the pinion moves forward of the center of the rear-wheel and to a position above the bottom of the internal gear. See dotted line representation in Fig. 4.

The upward movement of the shaft, $e$, allowed by the eccentric, $g$, in the direction of the arrow in Fig. 4, elevates the whole frame of the bicycle, said frame moving on a fulcrum which has its pivotal connection with the front wheel at $x$.

The effectiveness of the force of the leg applied to the pedal in turning the crank-shaft, decreases as the dead center or the point where the pedal cranks are nearly vertical is approached, and at the dead center the force has no propulsive effect by turning said shaft. As the dead center is approached there ceases to be sufficient force to maintain the pinion, $j$, above the bottom of the internal gear and then the weight of the frame and the rider, and the pressure exerted on the pedals all tend to press the pinion down and back, and thereby rotate the rear wheel through a distance corresponding with the extent the eccentric, $g$, moves. Thus at those points where the force applied to the pedals ceases to be effective in turning the crank-shaft, the weight of the rider is utilized to propel the machine, and dead centers, so-called, are effectually overcome.

It will be seen that by my arrangement a certain amount of power is stored up at the points where the pedal action is most effective for use in propelling the machine at points where the pedal action has little or no effect. By such an arrangement the propulsive energy expended is more uniformly distributed, and a more effective application thereof obtained.

It is to be observed that by my improved arrangement above described, friction in the bearings of the rear wheel back of its center is in a large measure annulled by reason of the fact that the weight of the rider is carried forward of that center a large portion of the time. By such a disposition of the weight it is deprived of any retarding effect such as occurs in the ordinary construction of bicycles where a large portion of the weight is felt back of the center of rotation of the rear wheel.

Another advantage of my improved construction is the greater ease with which obstructions in the surface traveled are overcome, for when the wheel encounters an obstruction the driving pinion will advance in the internal gear and the weight will be applied to carry the wheel over the obstruction, a certain leverage being established for the time being through which the weight acts.

What I claim as my invention is as follows:

1. In a velocipede, the combination of a ground-wheel having a hub with an internal gear, an oscillatory bearing journaled in the hub concentrically therewith, a pinion in mesh with the internal gear and having an axle journaled in said bearing eccentric to the same, a seat-carrying frame supported by said axle, and driving means connected with the latter.

2. In a velocipede, the combination of a ground-wheel having a hollow hub with an internal gear on the interior of the peripheral portion of said hub, circular disks journaled in the ends or heads of the hub concentrically therewith and forming an oscillatory bearing, a pinion in mesh with the internal gear and having an axle journaled in the said disk eccentrically thereto, a seat-carrying frame supported by said axle, and driving means connected with the latter.

3. In a velocipede, the combination of a ground-wheel having a hollow hub with an internal gear on the interior of the peripheral portion of said hub, circular disks journaled in the ends or heads of the hub concentrically therewith, a pinion in mesh with the internal gear and having a tubular axle journaled in the said disks eccentrically thereto, driving means applied to said tubular axle, a fixed axle extending through said tubular axle, and a frame connected with said fixed axle.

4. In a velocipede, the combination of a ground-wheel having a hub with an internal gear, an oscillatory bearing journaled in the hub concentrically therewith, a pinion in mesh with the internal gear and having an axle journaled in said bearing eccentric to the same, a seat-carrying frame supported by said axle, driving means connected with the latter, and means for limiting movement of the oscillatory bearing.

5. In a velocipede, the combination of a ground-wheel having a hollow hub with an internal gear on the interior of the peripheral portion of said hub, circular disks journaled in the ends or heads of the hub concentrically therewith, and forming an oscillatory bearing a yoke rigidly connecting said disks, a pinion in mesh with the internal gear and having an axle journaled in the disk eccentrically thereto, a seat-carrying frame supported by said axle, and driving means connected with the latter.

6. In a velocipede, the combination of a ground-wheel having a hollow hub with an internal gear on the interior of the peripheral portion of said hub, circular disks journaled in the ends or heads of the hub concentrically therewith, and forming an oscillatory bearing a pinion in mesh with the internal gear and having an axle journaled in the said disks eccentrically thereto, a seat-carrying frame supported by said axle, driving means connected with the latter, and an arm on one of the circular disks having abutments extending between portions of the frame to limit the movement of said disks.

7. In a bicycle, the combination of a rear ground-wheel having a hub with an internal gear, an oscillatory bearing journaled in said hub concentrically therewith, a pinion in mesh with the internal gear and having an axle journaled in said bearing, a seat-carrying frame pivotally connected at its forward end with the front ground-wheel and at its rear end with the pinion-axle, and driving means connected with the latter.

8. In a bicycle, the combination of a rear ground-wheel having a hub with an internal gear, an oscillatory bearing journaled in said hub concentrically therewith, a pinion in mesh with the internal gear and having an axle journaled in said bearing, a seat-carrying frame pivotally connected at its forward end with the front ground-wheel and at its rear end with the pinion-axle, a sprocket-wheel on said axle, a crank-shaft carrying a sprocket-wheel and a chain connecting the sprocket-wheels.

In testimony whereof I have signed my name to this specification, in the presence of two subscribing witnesses, this 19th day of May, A. D. 1894.

VICTOR BÉLANGER.

Witnesses:
  C. F. BROWN,
  A. D. HARRISON.